United States Patent [19]
O'Brien

[11] Patent Number: 5,297,355
[45] Date of Patent: Mar. 29, 1994

[54] FLY FISHING PRACTICE DEVICE

[76] Inventor: Dan O'Brien, 916 St. Andrew St., Rapid City, S. Dak. 57701

[21] Appl. No.: 58,169

[22] Filed: May 5, 1993

[51] Int. Cl.$^5$ .......................... A01K 97/00; F41J 5/04
[52] U.S. Cl. .......................................... 43/4; 273/377
[58] Field of Search ................. 43/4, 1; 273/377, 381, 273/371, 330, 345, 140

[56] References Cited

U.S. PATENT DOCUMENTS

| | | |
|---|---|---|
| 420,149 | 1/1890 | Elson . |
| 464,391 | 12/1891 | Samuels . |
| 484,950 | 10/1892 | Dungey . |
| 1,551,685 | 9/1925 | O'Brien . |
| 2,107,672 | 2/1938 | Lang . |
| 2,146,194 | 2/1939 | Rubens et al. . |
| 2,320,145 | 5/1943 | LaDue . |
| 2,848,232 | 8/1958 | Waddell . |
| 3,463,494 | 8/1969 | Stroh . |
| 4,635,942 | 1/1987 | Flaherty, Jr. .................. 273/377 |
| 4,976,439 | 12/1990 | Kraemer . |
| 5,110,136 | 5/1992 | Land . |

FOREIGN PATENT DOCUMENTS 256766 8/1926 United Kingdom ................ 273/377

Primary Examiner—Paula A. Bradley
Assistant Examiner—Jeanne M. Elpel
Attorney, Agent, or Firm—Caesar, Rivise, Bernstein, Cohen & Pokotilow, Ltd.

[57] ABSTRACT

A fly fishing practice and amusement device utilizing a magnetic conducting target plate. The device has a central box to which a plurality of target units can be connected. Visual or aural indications are given when the target is hit by a simulated fly with a steel leader which completes a connection between the conducting plate and a projecting conducting lip at the target unit. A digital counter can be used for each target unit which keeps count of the number of hits by each of the participants over a given time period.

18 Claims, 2 Drawing Sheets

U.S. Patent  Mar. 29, 1994  Sheet 1 of 2  5,297,355
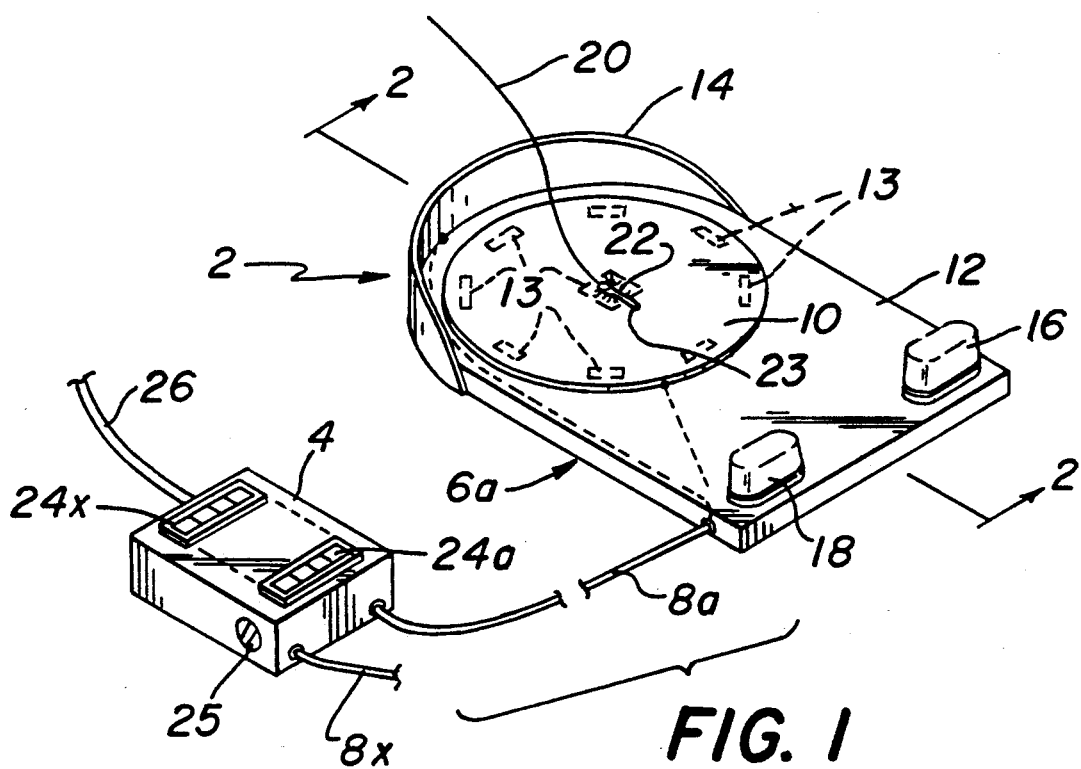
FIG. 1
FIG. 2
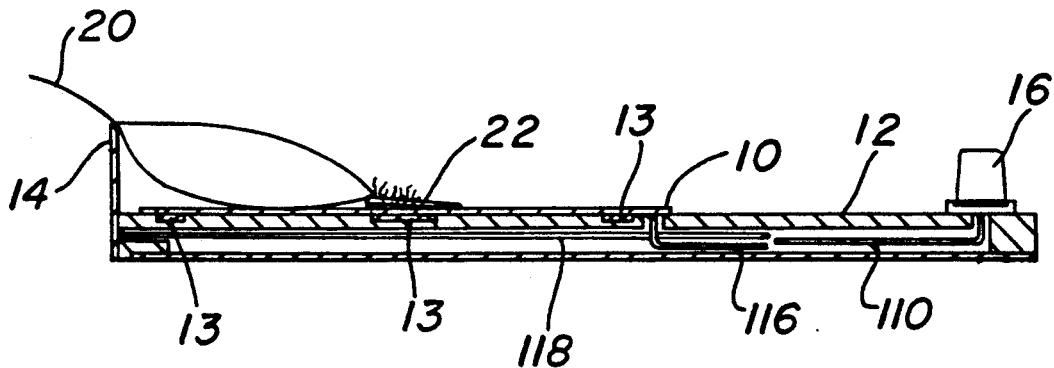

FLY FISHING PRACTICE DEVICE

BACKGROUND OF THE INVENTION

This invention relates generally to a device for practicing fly fishing, and more particularly to a fly fishing device which employs a magnetized, conducting plate as a target area for practicing fly casting and for amusement purposes.

Various types of games or practice devices which use magnets at the end of fishing lines to catch toy fish are disclosed in U.S. Pat. No. 464,391 (Samuels); U.S. Pat. No. 484,950 (Dungey); and U.S. Pat. No. 2,107,672 (Lang).

Other patents which show the use of hooks on the ends of lines to catch fish include U.S. Pat. No. 2,848,232 (Waddell); U.S. Pat. No. 420,149 (Elson); U.S. Pat. No. 1,551,685 (O'Brien); and U.S. Pat. No. 2,146,194 (Rubens et al.). Still other devices which comprise games for the practicing of casting are disclosed in U.S. Pat. No. 4,976,439 (Kraemer), which discloses a line with a target in a wedge at the end of the line; U.S. Pat. No. 2,320,145 (LaDue) which discloses a target fish used in a stream with actual fishing tackle for fly casting contests; U.S. Pat. No. 3,463,494 (Stroh) which uses a part of a simulated fish attached to a casting line with the other part of the fish installed on the target which includes springs to simulate the actual retrieval of fish; and U.S. Pat. No. 5,110,136 (Land) which discloses engaging material at the end of a line for casting practice to hook in artificial fish.

However, none of the existing games or practice devices incorporate the use of an electrical circuit which provides audio and/or visual signals when the simulated fly at the end of the line hits a magnetized target plate, as does the present invention.

OBJECTS OF THE INVENTION

Accordingly, it is the general object of the instant invention to provide a fly fishing practice and amusement device which improves upon existing devices.

It is a further object of the instant invention to provide a fly fishing practice and amusement device which can be used by more than one individual simultaneously.

It is still a further object of the instant invention to provide a fly fishing practice and amusement device which completes an electrical connection and signals the participant when a target is hit.

It is yet a further object of the instant invention to provide a fly fishing practice and amusement device which has a magnetized target plate which prevents the fly from bouncing off the target when a hit is made.

It is still yet a further object of the instant invention to provide a fly fishing practice and amusement device which automatically counts the number of successful hits of the target area in a given amount of time.

It is another object of the instant invention to provide a fly fishing practice and amusement device which can accommodate a plurality of target units at one time.

SUMMARY OF THE INVENTION

These and other objects of the invention are achieved by providing a fly fishing practice and amusement device which comprises a target unit with a conducting magnetized target disk or plate and a projecting lip. When the simulated fly, which is attached to a steel leader, lands on the target plate, an electrical connection is made which operates an audio or visual signal device. In addition, a digital counter is used to indicate the number of hits a participant obtains in a given time period.

The device incorporates a central unit with a cable to the target unit which can accommodate a plurality of target units simultaneously. Thus, a participant can practice casting in various directions and to various locations at any given time without the necessity of moving the target unit. Furthermore, a plurality of participants can cast and can compete with others by attempting to get the most numbers of hits in a given time.

DESCRIPTION OF THE DRAWING

Other objects and many of the intended advantages of this invention will be readily appreciated when the same becomes better understood by reference to the following detailed description when considered in connection with the accompanying drawings, wherein:

FIG. 1 is a prospective view of the fly fishing practice and amusement device of the present invention;

FIG. 2 is a sectional view of the target unit of the fly fishing practice and amusement device taken along the line 2—2 of FIG. 1;

DETAILED DESCRIPTION OF THE PREFERRED EMBODIMENTS

Figure 3:
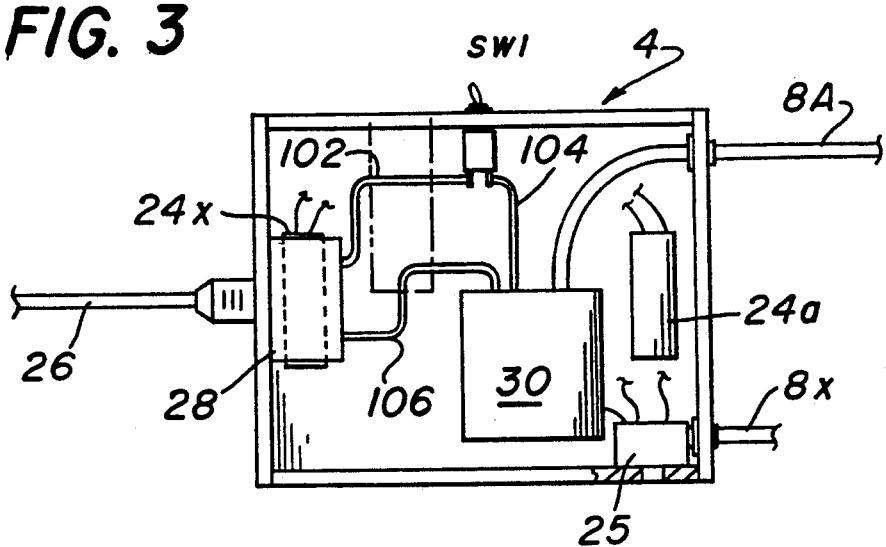
FIG. 3 is a top view of the control unit of the fly fishing practice and amusement device taken with the cover of the control unit removed.

Referring now in greater detail to the various figures of the drawing, wherein like reference characters refer to like parts, there is shown in FIGS. 1 and 2 the fly fishing device 2 of the present invention. The fly fishing device 2 comprises a control unit 4 and a target unit 6a. It should be noted that although one target unit 6a is shown, a plurality of target units 6a-6x may be used. Cables 8a-8x connect each of the units 6a-6x to the control box 4 respectively.

The target unit 6a comprises a conducting plate 10 which is mounted on an insulated base 12. A projecting lip 14 is mounted on one end of the insulated base 12, adjacent the conducting plate 10. Mounted at the other end of the insulated base 12 are lights 16 and 18. As will be explained in detail later, the light 16 will operate when power is applied to the device by switch SW1, and the light 18 will operate when the target is hit.

The participant, using a fly rod, casts the line toward the target. Attached to the line is a steel leader 20 with the shank 21 of a fish hook and a simulated fly 22 attached thereto. The simulated fly 22 can be made of steel wool or any other suitable conducting ferritic material. If the simulated fly 22 lands on the conducting plate 10, the steel leader 20 will rest against the projecting lip 14. This completes a circuit which, as will be explained later, turns off light 16 and turns on light 18. In addition, the control box 4 comprises an annunciator 25 which is activated when the circuit is completed. When the participant removes the line from the target unit, i.e., removes the simulated fly from the conducting plate 10, and the steel leader 20 from the projecting lip 14, to recast the fly, the circuit is broken and the target light 18 is extinguished and the power-on light 16 is again operated.

A number of permanent magnets 13 are installed beneath, and attached to the underside of, the plate 10. The plate 10 can be made of a conducting material such as aluminum. The magnets 13 create a magnetic field at, and above, the upper surface of the plate 10. When the ferritic fly 22 and the shank 21 strike the plate, the magnetic field will prevent them from bouncing off the plate.

The control box 4 also includes digital displays 24a-24x for each target unit 6a-6x, respectively. The digital counters will accumulate the total number of hits at each target unit. Cable 26 connects power to the control box 4. Alternatively, as will be explained later, a rechargeable battery can be used to power the device.

Figure 4:
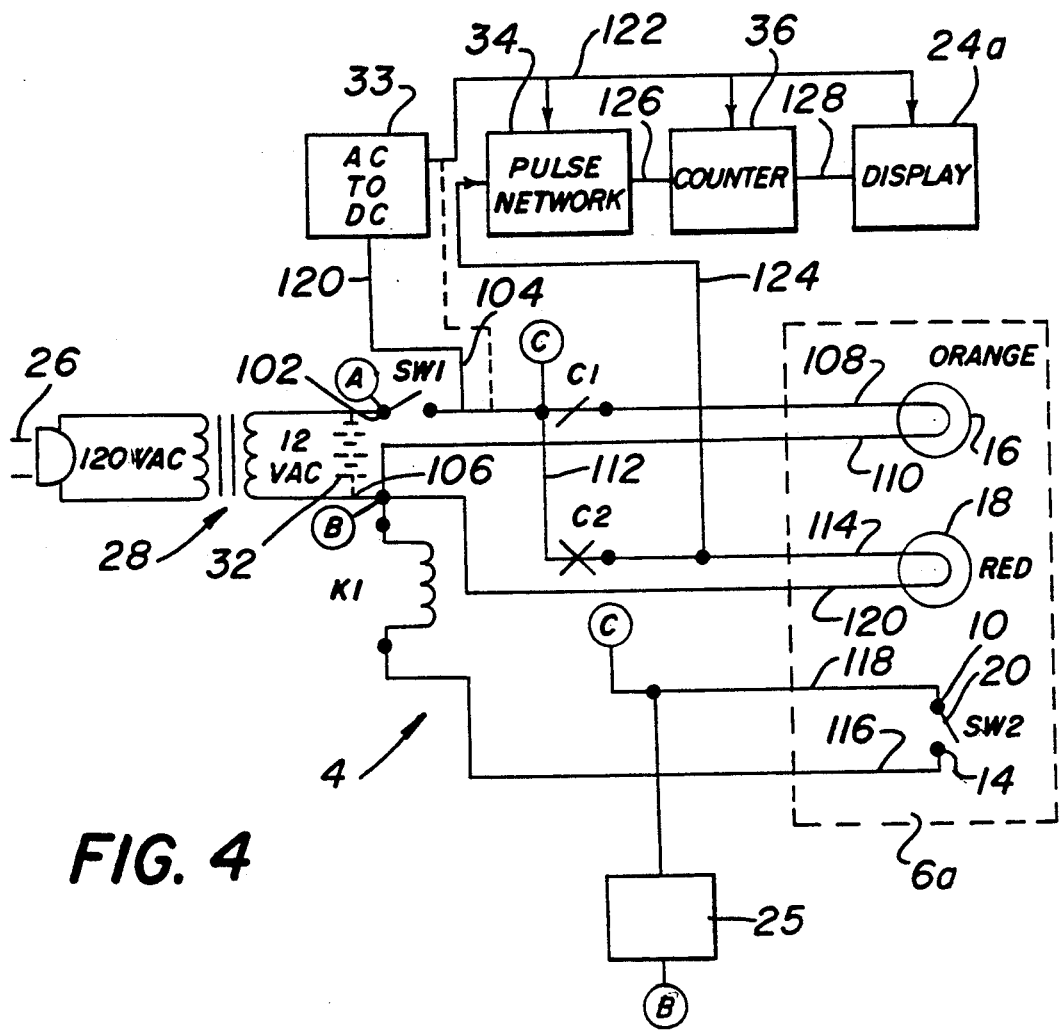
FIG. 4 is a schematic diagram of the electrical and electronic circuitry mounted in the control unit.

FIG. 3 shows the electrical components mounted in the control box 4. Cable 26 provides power to a step-down transformer 28 which changes the 120 volt a.c. input to 12 volts a.c. As can be seen in FIGS. 3 and 4, one side of the secondary of the transformer 28 at point A is connected to one side of the power switch S1 by line 102. The other side of the power switch S1 at point C is connected to the electromagnetic circuitry in housing 30 by line 104. The other side of the secondary of the transformer 28 at point B on line 106 is also connected to the circuitry in the housing 20.

Referring now to FIG. 4, it can be seen that lines 104 and 108, through normally closed contacts C1 of the relay K1, are connected to the power-on light 16. The other side of the power-on light 16 on line 110 connects to the other side of the secondary of the transformer 28 via lines 110 and 106 at point B. Line 104 also connects to line 114, through normally open contacts C2, which is in turn connected to one side of the target light 18. The other side of the target light 18 is connected to the other side of the secondary of the transformer 28 via lines 120 and 106 at point B.

One side of the relay K1 is connected to line 106, i.e., one side of the secondary of the transformer 28 at point B, and the other side of the relay K1 is connected to the projecting lip 14. When the steel leader 20 contacts the projecting lip 14, a connection is made between the projecting lip 14 and the conducting plate 10 (illustrated here as SW2) as was previously explained. This completes the connection between line 116 (one side of K1) to line 118, which is in turn connected to the other side of the secondary of the transformer 18 at point C. Also connected to the secondary of the transformer 28 is the circuitry which operates the displays 24a-24x on the control unit 4. The secondary of the transformer 28 at point C is connected via line 120 to an AC to DC converter 33 which provides a DC voltage on line 122. This voltage is provided to a pulse network 34, a digital counter 36, and the display 24a.

The operation of the circuitry of FIG. 4 will now be explained. When the power-on switch S1 is closed, power is applied via line 104, the normally closed contact C1 of the relay K1, and lines 108, 110 and 116, to operate the power-on light 16. If a participant successfully hits the target, i.e., he causes the artificial fly 21 to land on the conducting plate 10, the leader 20 connects the open side of the relay K1 to power at point C, as illustrated by switch SW2, causing the relay K1 to operate. This opens normally closed contact C1, extinguishing the power-on light 16, and closes the normally open contact C2, which applies power to operate the target light 18 via lines 120, 114, and 112. Thus, when a target hit occurs, the on/off power light 16 switches off and the target light 18 switches on. Although the power-on light 16 is shown as orange while the target light 18 is shown as red, any other two contrasting colors can be used.

In addition, when the participant hits the target, power is applied to annunciator 25 at point C on line 118. This causes the annunciator to sound.

Also, when the target light 18 is powered, the voltage appears on line 114. This is connected to the input of the pulse network 34 via line 124. The pulse network 34 converts the step function of voltage on line 124 into a pulse which is directed into the digital counter 36 via line 126. The output of the counter 36 is connected to the input of the digital display 24a by line 128.

When the artificial fly 22 is removed from the conducting plate 10, power is removed from the relay K1, which causes the relay to drop out, again closing contact C1 which operates the power-on light 16, and opening contact C2 to extinguish the target light 18. Removal of the fly 22 also removes power from the annunciator 25 and causes it to cease operation.

It should also be noted, that a rechargeable battery 32 (shown dotted) may be used in place of the AC power source on cable 26 and the power transformer 28 to provide power to the unit. In this case, the AC to DC converter 33, the transformer 28 and the cable 26 are not required. The connection shown dotted, from line 104 at point C to line 122, provides DC power to the pulse network 34, the counter 36 and the display 24a.

The device can be fabricated from readily available off-the-shelf, commercial, lights and components. For example, the rechargeable battery 32 may be a 12 volt battery, Serial #12-621, made by Dual-Lite of Newtown, Conn., or equivalent and the annunciator 25 may be a buzzer, serial number J4-812 made by GC Electronics of Rockford, Ill. Similarly, the design of the AC to DC convertor 33, the pulse network 34, the counter 36 and the display 24a are well known to those skilled in the art and available as standard, commercial chips.

The fly fishing device 2 may be used both as a practice device and as an amusement game. As a practice device, a participant can practice fly casting techniques with the device getting a visual and/or aural indication when the target is hit. A single target unit or a plurality of target units may be used.

As an amusement game, a plurality of participants can compete with each other, each taking turns at attempting to hit a single target unit or a plurality of targets while the digital counters and displays keep score of the number of hits of each of the participants.

A regular fishing rod and reel can be used with a steel leader and a normal lure or fly and hook replaced by the simulated fly 22 and hook shank 21. The simulated fly 22 can be weighted to approximate the normal weight which an angler would feel when fly fishing.

Without further elaboration, the foregoing will so fully illustrate my invention that others may, by applying current or future knowledge, readily adapt the same for use under the various conditions of service.

I claim:

1. A fly fishing system for practicing fly casting and for amusement purposes, comprising a control unit with a power-on/off switch; a power supply; a target unit comprising a conducting plate, means for applying a magnetic field through and around said conducting plate, and a conducting front lip; a fly fishing rod comprising a line, a leader attached to said line and an artificial fly of ferritic material attached to said leader; and a cable connecting said target unit to said control unit.

2. The system of claim 1 wherein said means for applying said magnetic field comprises a plurality of permanent magnets positioned proximate said conducting plate.

3. The system of claim 2 wherein said target unit further comprises a target hit light and a power-on light, which is responsive to the operation of said power-on/off switch.

4. The system of claim 3 wherein said control unit further comprises an annunciator and means for operating said target hit light and annunciator when said artificial fly contacts said conducting plate and said leader contacts said conducting front lip.

5. The system of claim 4 wherein said means for operating said target hit light and annunciator comprises a relay which has a first set of normally open contacts wired in series between said power supply and said target hit light, said relay being operated when said artificial fly contacts said conducting plate and said leader contacts said conducting front lip.

6. The system of claim 5 wherein said relay further comprises a second set of normally closed contacts which are wired in series between said power supply and said power-on light.

7. The system of claim 6 wherein said control unit further comprises means for counting and displaying the number of times said target hit light is operated.

8. The system of claim 7 wherein said power supply comprises an AC power source, a power cable connected to said power source and a step-down transformer connected to said power cable.

9. The system of claim 7 wherein said power supply comprises a rechargeable battery.

10. A fly fishing practicing and amusement system comprising: a control unit with a power-on/off switch; a power supply; a plurality of target units, each of said plurality of target units comprising a conducting plate, means for applying a magnetic field through and around said conducting plate and a conducting front lip; a fly fishing rod comprising a line, a leader attached to said line, and an artificial fly of ferritic material attached to said line; and a plurality of cables, each of said plurality of cables connecting a respective one of said plurality of target units to said control unit.

11. The system of claim 10 wherein said means for applying said magnetic field comprises a plurality of permanent magnets positioned proximate said conducting plate.

12. The system of claim 11 wherein each of said plurality of target units comprises a target hit light and a power-on light which is responsive to the operation of said power-on/off switch.

13. The system of claim 12 wherein said control unit further comprises an annunciator and means for operating said target hit light of a respective one of said plurality of target units and said annunciator when said artificial fly contacts said conducting plate and said leader contacts said conducting front lip of said respective one of said plurality of target units.

14. The system of claim 13 wherein said means for operating said target hit light and said annunciator comprises a relay which has a first set of normally open contacts wired in series between said power supply and said target hit light, said relay being operated when said artificial fly contacts said conducting plate and said leader contacts said conducting front lip.

15. The system of claim 14 wherein said relay further comprises a second set of normally closed contacts which are wired in series between said power supply and said power-on light.

16. The system of claim 15 wherein said control unit further comprises a means for counting and displaying the number of times said target hit light is operated on each of said plurality of target units.

17. The system of claim 16 wherein said power supply comprises an AC power source, a power cable connected to said power source and a step-down transformer connected to said power cable.

18. The system of claim 16 wherein said power supply comprises a rechargeable battery.

* * * * *